(12) United States Patent
Zhao et al.

(10) Patent No.: US 9,434,036 B2
(45) Date of Patent: Sep. 6, 2016

(54) REPLACING MECHANISM FOR RUBBING ROLLERS IN RUBBING EQUIPMENT

(71) Applicants: BOE TECHNOLOGY GROUP CO., LTD., Beijing (CN); HEFEI BOE OPTOELECTRONICS TECHNOLOGY CO., LTD., Hefei (CN)

(72) Inventors: Yazhou Zhao, Beijing (CN); Juan Wang, Beijing (CN); Xin Hu, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 411 days.

(21) Appl. No.: 14/105,139

(22) Filed: Dec. 12, 2013

(65) Prior Publication Data
US 2014/0157563 A1 Jun. 12, 2014

(30) Foreign Application Priority Data

Dec. 12, 2012 (CN) .......................... 2012 1 0537804

(51) Int. Cl.
| | |
|---|---|
| *B23Q 3/157* | (2006.01) |
| *G02F 1/1337* | (2006.01) |
| *B23P 19/04* | (2006.01) |
| *B65G 13/00* | (2006.01) |

(52) U.S. Cl.
CPC ........... *B23P 19/04* (2013.01); *B23Q 3/15706* (2013.01); *B65G 13/00* (2013.01); *G02F 1/133784* (2013.01); *Y10T 29/5191* (2015.01); *Y10T 483/13* (2015.01); *Y10T 483/17* (2015.01); *Y10T 483/1736* (2015.01); *Y10T 483/1809* (2015.01); *Y10T 483/1873* (2015.01)

(58) Field of Classification Search
None
See application file for complete search history.

(56) References Cited

U.S. PATENT DOCUMENTS

| | | | | |
|---|---|---|---|---|
| 7,518,682 B2 * | 4/2009 | Choi | ................. | G02F 1/133784 349/126 |
| 7,583,352 B2 * | 9/2009 | Choi | ................. | G02F 1/133784 349/123 |
| 8,511,127 B2 * | 8/2013 | Blecher | ................. | B21B 31/103 483/16 |

FOREIGN PATENT DOCUMENTS

| | | |
|---|---|---|
| CN | 202083860 U | 12/2011 |
| CN | 202230280 U | 5/2012 |

(Continued)

OTHER PUBLICATIONS

Machine Translation of CN 202083860 U, which CN '860 was published Dec. 2011.*

*Primary Examiner* — Erica E Cadugan
(74) *Attorney, Agent, or Firm* — Blakely, Sokoloff, Taylor & Zafman LLP

(57) ABSTRACT

The present invention discloses a replacing mechanism for rubbing rollers in rubbing equipment, comprising a stage, an exchange placement platform, an exchange unit, and a connecting device for connecting the exchange placement platform and a rubbing platform in the rubbing equipment, and the stage is provided with placement grooves arranged in parallel, the number of which is larger than that of the rubbing rollers in the rubbing equipment, and in a rubbing roller replacing position, a first pressing device and/or a second pressing device of the rubbing equipment takes down worn rubbing rollers from the rubbing equipment and puts the worn rubbing rollers into vacant placement grooves in the stage, or takes out new rubbing rollers from the placement grooves and installing the new rubbing rollers on the rubbing equipment.

12 Claims, 3 Drawing Sheets

(56) References Cited

FOREIGN PATENT DOCUMENTS

| CN | 202372733 | U | * | 8/2012 |
| CN | 202533682 | U |   | 11/2012 |
| CN | 202967044 | U | * | 6/2013 |
| CN | 104503146 | A | * | 4/2015 |
| JP | 03-185426 | A | * | 8/1991 |
| JP | H 09189912 | A |   | 7/1997 |
| TW | 200949387 | A |   | 12/2009 |

* cited by examiner

Exchange Unit for Transferring the Stage 2 Between the Exchange Placement Platform 1 and the Transport Vehicle 3

Fig. 4

Alternative Embodiment Wherein the Stage Includes Four Placement Grooves

Fig. 5

REPLACING MECHANISM FOR RUBBING ROLLERS IN RUBBING EQUIPMENT

FIELD OF THE INVENTION

The present invention relates to the technical field of replacing rubbing rollers automatically, in particular to a replacing mechanism for replacing rubbing rollers in rubbing equipment.

BACKGROUND OF THE INVENTION

In a rubbing alignment process of TFT-LCD production, rubbing rollers of rubbing equipment are used for rubbing, and when it reaches the end of the service life of the rubbing rollers, the rubbing rollers of the rubbing equipment need to be replaced. Roller replacing modes adopted at present are classified into two categories: a manual mode and an automatic mode. The manual roller replacing mode is low in safety and is likely to cause safety problems, and thus in most roller replacing modes at present, the automatic roller replacement is adopted.

The replacing mechanism currently used comprises a stage exchange unit, an exchange placement platform, a stage elevating unit and two stages, and an electromagnetic connector arranged between the exchange placement platform and a rubbing platform of the rubbing equipment.

Each stage is provided with two placement grooves for placing the rubbing rollers.

In specific operations of exchanging the rubbing rollers, a first stage with two new rubbing rollers placed thereon is conveyed by a transport vehicle to an initial position of the exchange placement platform, while a second stage with two vacant placement grooves has been already placed on the exchange placement platform, and the stage exchange unit stretches out and takes out the first stage on the transport vehicle, and brings the first stage to a front waiting position; the rubbing platform of the rubbing equipment advances and is connected with the exchange placement platform through the electromagnetic connector, and the rubbing platform retreats and pulls the exchange placement platform to a rubbing roller replacing position, so that one of the two vacant placement grooves on the second stage is opposite to a first pressing device of the rubbing equipment, and the other vacant placement groove is opposite to a second pressing device of the rubbing equipment, and at the same time the stage exchange unit brings the first stage back to a stage exchanging position, clamps the first stage through the stage elevating unit and elevates the first stage to a high stand-by position; the first pressing device and the second pressing device respectively put two worn rubbing rollers which have reached their service life in the rubbing equipment into the two placement grooves of the second stage, then the rubbing platform conveys the exchange placement platform back to the stage exchanging position, and the stage exchange units takes away the second stage with the worn rubbing rollers placed thereon from the exchange placement platform and places it onto the transport vehicle; and the stage elevating unit descends and places the first stage onto the exchange placement platform, and the rubbing platform advances again, is connected with the exchange placement platform through the electromagnetic connector, and then retreats and pulls the exchange placement platform to the rubbing roller replacing position, so that one of the two placement grooves of the first stage is opposite to the first pressing device, the other placement groove is opposite to the second pressing device, the first pressing device and the second pressing device respectively take out and install the new rubbing rollers in the placement grooves opposite thereto, and the rubbing platform brings the exchange placement platform to its initial state, thus one exchange procedure is completed.

To ensure safety in the process of replacing rubbing rollers, the moving speeds of various components of the above replacing mechanism are very low. Although the rubbing rollers of the rubbing equipment can be replaced by using the above replacing mechanism, the two stages, namely the first stage and the second stage need to be used in the above replacing mechanism for taking, putting and exchanging the rubbing rollers, and the stage elevating unit is required to lift and then lower the first stage in specific operations, so that the second stage placed on the exchange placement platform is replaced by the first stage; in addition, the exchange placement platform needs to move back and forth between the stage exchange position and the rubbing roller replacing position for several times, the distance of travel is long, and the process is complicated, so it takes long time for the above replacing mechanism to replace the rubbing rollers in the rubbing equipment.

SUMMARY OF THE INVENTION

The present invention provides a replacing mechanism, which has a simple structure, needs simple process in operation, and consumes less time.

To achieve the above object, the following technical solutions are provided in the present invention:

A replacing mechanism for replacing rubbing rollers in rubbing equipment, the rubbing equipment comprises pressing devices for taking down worn rubbing rollers from the rubbing equipment and putting the worn rubbing rollers into vacant placement grooves of a stage and/or taking out new rubbing rollers from placement grooves of the stage in which the new rubbing rollers are placed and installing the new rubbing rollers on the rubbing equipment; the replacing mechanism comprises a stage with placement grooves for holding rubbing rollers, an exchange placement platform for conveying the stage to a rubbing roller replacing position, an exchange unit for taking out the stage from a transport vehicle and placing the stage onto the exchange placement platform or taking out the stage from the exchange placement platform and placing the stage onto the transport vehicle, and a connecting device for connecting the exchange placement platform and a rubbing platform in the rubbing equipment, and the stage is provided with placement grooves arranged in parallel, the number of which is larger than that of the rubbing rollers in the rubbing equipment.

For example, the rubbing equipment is provided with two rubbing rollers and two pressing devices, wherein the two pressing devices are respectively a first pressing device and a second pressing device, and each pressing device in the rubbing equipment corresponds to one of the rubbing rollers of the rubbing equipment; and the stage is provided with at least three placement grooves arranged in parallel.

For example, the stage is provided with three placement grooves arranged in parallel, which are a first placement groove, a second placement groove and a third placement groove in this order, and the rubbing roller replacing position has:

an exchange station in which the first placement groove is opposite to the second pressing device and the second placement groove is opposite to the first pressing device; and an exchange station in which the second placement groove is opposite to the second pressing device and the third placement groove is opposite to the first pressing device.

For example, the rubbing roller replacing position also has an exchange station in which the first placement groove is opposite to the first pressing device.

For example, the stage is provided with four placement grooves arranged in parallel, which are a fourth placement groove, a fifth placement groove, a sixth placement groove and a seventh placement groove in this order; and
the rubbing roller replacing position includes:
an exchange station in which the fourth placement groove is opposite to the second pressing device and the fifth placement groove is opposite to the first pressing device; and
an exchange station in which the sixth placement groove is opposite to the second pressing device and the seventh placement groove is opposite to the first pressing device.

For example, the replacing mechanism further comprises position sensors for exchange placement platforms in one-to-one correspondence with the exchange stations, used for sensing whether the exchange placement platform has run to the corresponding exchange station in the rubbing roller replacing position.

For example, the connecting device is an electromagnetic connector.

For example, the stage is provided with limit holes for restricting the stage from moving on the transport vehicle.

For example, the stage is provided with limit holes for restricting the stage from moving on the exchange placement platform.

For example, the stage is provided with rubbing roller stop pins at an end corresponding to the active ends of the rubbing rollers put in the placement grooves thereof.

Beneficial Effects:

The replacing mechanism provided in the present invention only needs one stage.

During use, the transport vehicle transports the stage to an initial position of the exchange placement platform, the exchange unit removes the stage from the transport vehicle and places the stage onto the exchange placement platform, the exchange placement platform is connected with the rubbing platform of the rubbing equipment through the connecting device, the exchange placement platform is pulled to the rubbing roller replacing position by the rubbing platform, the exchange placement platform is driven by the rubbing platform to run to different exchange stations in the rubbing roller replacing position, the replacement of the rubbing rollers on the rubbing equipment can be achieved by controlling actions of the first pressing device and the second pressing device, then the rubbing platform drives the exchange placement platform to return to its initial state, and the exchange unit places the stage having rubbing rollers replaced onto the transport vehicle. Thus one exchange process is completed. In the whole process, the exchange placement platform only needs to be moved between the initial position and the rubbing roller replacing position once to achieve the replacement of two rubbing rollers in the robbing equipment. In comparison with the replacing mechanism mentioned in the background art, the number of stage is reduced by one, and no stage elevating unit is needed, so the equipment is simple in structure, and meanwhile, the process is simple, and less time is consumed.

BRIEF DESCRIPTION OF THE DRAWINGS

In order to clearly illustrate the technical solutions in the embodiments of the disclosure or in the prior arts, the drawings of the embodiments will be briefly described in the following; it is obvious that the described drawings are only related to some embodiments of the disclosure and thus are not limitative of the disclosure.

FIG. 4 is a schematic representation of the exchange unit; and

FIG. 5 is a schematic representation of an alternative embodiment.

DETAILED DESCRIPTION OF THE DRAWINGS

The technical solutions in embodiments of the present invention will be described below in a clear and complete manner in conjunction with the accompanying drawings in the embodiments of the present invention. Obviously, the described embodiments are only part of the embodiments of the present invention, not all of them. Based on the embodiments in the present invention, all other embodiments obtained by those of ordinary skill in the art without creative effort fall into the scope of the present invention.

Figure 1:
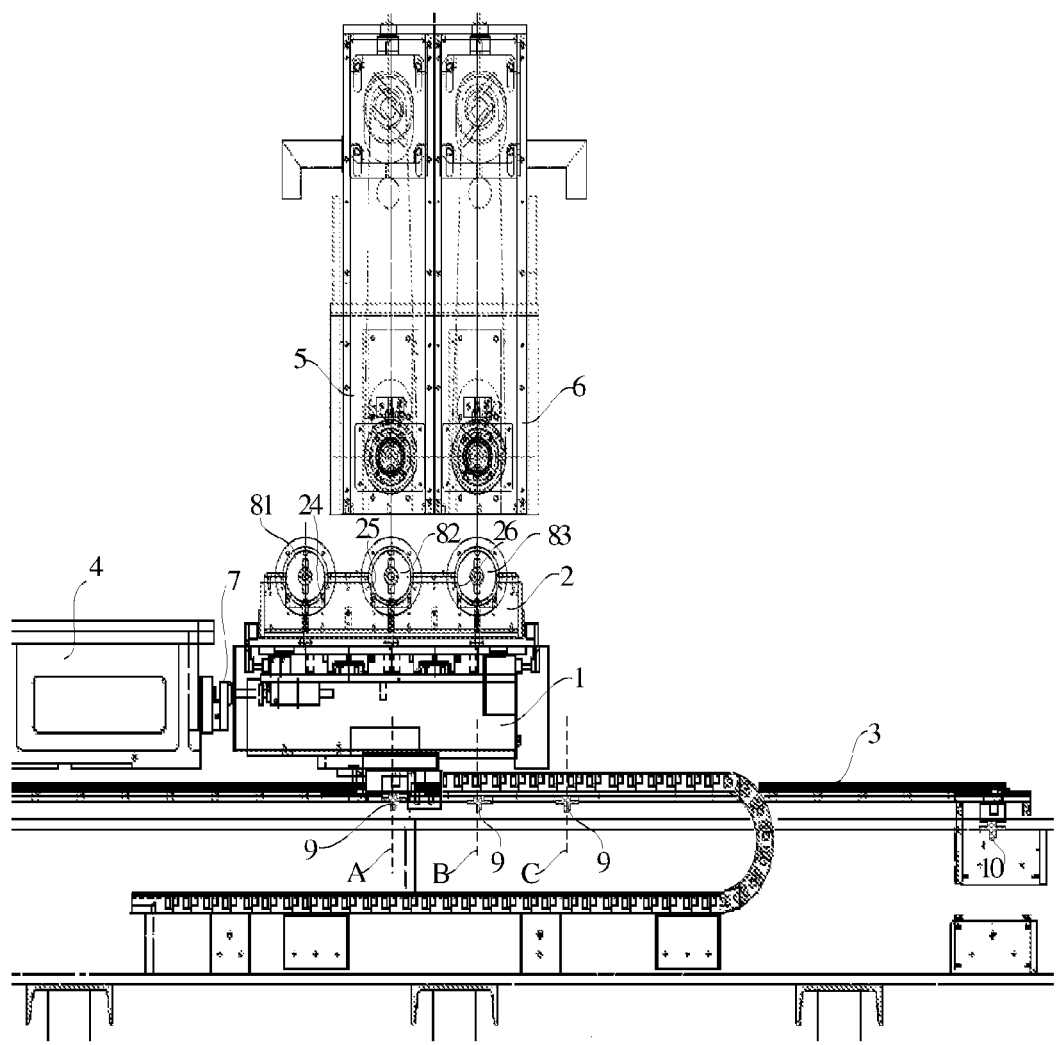
FIG. 1 is a schematic view of a principle structure of a replacing mechanism provided in the present invention.

As illustrated in FIG. 1, a replacing mechanism for rubbing rollers in rubbing equipment provided in the present embodiment comprises a stage 2 with placement grooves for placing rubbing rollers, an exchange placement platform 1 for conveying the stage 2 to a rubbing roller replacing position, an exchange unit (schematically shown in FIG. 4) for taking out the stage 2 with new rubbing rollers placed thereon from a transport vehicle 3 and placing the stage 2 onto the exchange placement platform 1 and/or taking out the stage 2 with worn rubbing rollers placed thereon from the exchange placement platform 1 and placing the stage 2 onto the transport vehicle 3, and a connecting device 7 for connecting the exchange placement platform 1 with a rubbing platform 4 in the rubbing equipment; in the case that the rubbing equipment has two rubbing rollers, the stage 2 is provided with at least three placement grooves arranged in parallel, that is, the number of the placement grooves on the stage 2 is at least one more than the number of the rubbing rollers present on the rubbing equipment, so that before and after any rubbing roller in the rubbing equipment is replaced, the stage 2 has at least one vacant placement groove; and in a rubbing roller replacing position, a first pressing device 6 and a second pressing device 5 of the rubbing equipment are used for taking down the worn rubbing rollers from the rubbing equipment and putting the worn rubbing rollers into the vacant placement grooves in the stage 2, and taking out the new rubbing rollers from the placement grooves of the stage 2 and installing the new rubbing rollers on the rubbing equipment. Of course, in some implementations, it is also possible to provide only one pressing device, for taking down the worn rubbing rollers from the rubbing equipment and putting the worn rubbing rollers into the vacant placement grooves in the stage 2, and taking out the new rubbing rollers from the placement grooves of the stage 2 and installing the new rubbing rollers on the rubbing equipment.

In the replacing mechanism provided in the embodiment, as the stage 2 is provided with at least three placement grooves, in order to facilitate description, by way of example, the case that the stage 2 is provided with three placement grooves arranged in parallel, and two worn rubbing rollers in the rubbing equipment need replacement is described as follows.

In the orientation as illustrated in FIG. 1, in specific operations, first, the exchange placement platform 1 is controlled to run to a station A (the rubbing roller replacing position includes the station A, that is, the central line of the exchange placement platform 1 is located on the dashed line A illustrated in the figure), the rightmost placement groove of the stage 2 being vacant at that time, and by using the first pressing device 6, first a worn rubbing roller 83 on the rubbing equipment can be detached and put into the vacant placement groove (i.e. the rightmost placement groove) of the stage 2, as illustrated in FIG. 1. Then the exchange placement platform 1 is controlled to run to a station B (the rubbing roller replacing position further includes the station B, that is, the central line of the exchange placement platform 1 is located on the dashed line B illustrated in the figure), and by using the first pressing device 6, a new rubbing roller 82 in the middle placement groove on the stage 2 is installed in the position where the worn rubbing roller has already been detached, thus the replacement of one worn rubbing roller is completed, and the placement groove of the stage 2 in which the new rubbing roller 82 was originally placed (i.e. the middle placement groove) becomes vacant. Then, the exchange placement platform 1 is controlled to run to the station A again, and by using the second pressing device 5, the other worn rubbing roller on the rubbing equipment is detached and put into the placement groove in which the new rubbing roller 82 was originally placed (i.e. the middle placement groove). Then the exchange placement platform 1 is controlled to run to the station B again, and by using the second pressing device 5, the other new rubbing roller 81 on the stage 2 is installed in the position where the worn rubbing roller was just detached, thus the replacement of the other worn rubbing roller is completed. At that time, only two worn rubbing rollers are left on the stage 2, and the replacement of the two worn rubbing rollers is completed.

Thus, the replacing mechanism provided in the embodiment only needs one stage 2. When in use, the transport vehicle 3 transports the stage 2 to an initial position of the exchange placement platform 1, at that time the exchange unit removes the stage 2 from the transport vehicle 3 and places the stage 2 onto the exchange placement platform 1, the exchange placement platform 1 is connected with the rubbing platform 4 of the rubbing equipment through the connecting device 7, the exchange placement platform 1 is pulled to the rubbing roller replacing position by the rubbing platform 4, the exchange placement platform 1 is driven by the rubbing platform 4 to run to different exchange stations (such as the above-mentioned station A and station B) included in the rubbing roller replacing position, the replacement of the rubbing rollers on the rubbing equipment can be achieved by controlling actions of the first pressing device 6 and the second pressing device 5, then the rubbing platform 4 drives the exchange placement platform 1 to return to the initial state, and the exchange unit places the stage 2 having rubbing rollers replaced onto the transport vehicle 3. Up to this point, one exchange process is completed. In the whole process, the exchange placement platform 1 only needs to be moved between the initial position and the rubbing roller replacing position (at least including two exchange stations) once to achieve replacement of the two rubbing rollers in the robbing equipment. In comparison with the replacing mechanism mentioned in the background art, the number of the stage is reduced by one, and no stage elevating unit is needed, so the equipment is simple in structure, and meanwhile, the process is simple, and less time is consumed.

Specifically, the stage 2 is provided with three placement grooves arranged in parallel, which are a first placement groove 24, a second placement groove 25 and a third placement groove 26 in this order.

When the replacement of rubbing rollers has not been performed, new rubbing rollers can be respectively placed in the first placement groove 24 and the second placement groove 25, that is, the first placement groove 24 and the second placement groove 25 are used as new rubbing roller placement grooves, and no rubbing roller is present in the third placement groove 26, that is, the third placement groove 26 is a vacant placement groove. In this case, the rubbing roller replacing position includes the station A and the station B, and when the exchange placement platform 1 is located in the station A, the second placement groove 25 is opposite to the second pressing device 5, and the third placement groove 26 is opposite to the first pressing device 6, as in the station A illustrated in FIG. 1; and when the exchange placement platform 1 is located in the station B, the first placement groove 24 is opposite to the second pressing device 5, and the second placement groove 25 is opposite to the first pressing device 6, as in the station B illustrated in FIG. 1.

In the embodiment, the process of replacing the two worn rubbing rollers on the rubbing equipment is as follows:

The exchange placement platform 1 is controlled to run to the station A of the rubbing roller replacing position. At that time the third placement groove 26 of the stage 2 has no rubbing roller therein and is opposite to the first pressing device 6, and by using the first pressing device 6, a worn rubbing roller 83 on the rubbing equipment can be first detached and put into the third placement groove 26, as illustrated in FIG. 1. Then the exchange placement platform 1 is controlled to run to the station B, so that the second placement groove 25 is opposite to the first pressing device 6, and by using the first pressing device 6, a new rubbing roller 82 in the second placement groove 25 is installed in the position where the worn rubbing roller has already been detached. Thus the replacement of one worn rubbing roller is completed, and the second placement groove 25 of the stage 2 has become vacant. Then, the exchange placement platform 1 is controlled to run to the station A again, so that the second placement groove 25 which has already become vacant is opposite to the second pressing device 5, and by using the second pressing device 5, the other worn rubbing roller on the rubbing equipment is detached and put into the second placement groove 25. Then the exchange placement platform 1 is controlled to run to the station B again, so that the first placement groove 24 is opposite to the second pressing device 5, and by using the second pressing device 5, the new rubbing roller 81 in the first placement groove 24 is installed in the position where the worn rubbing roller was just detached. Thus the replacement of the other worn rubbing roller is achieved. At that time, only two worn rubbing rollers are left on the stage 2, and the replacement of the two worn rubbing rollers is completed.

When the replacement of rubbing rollers has not been performed, new rubbing rollers can also be respectively placed in the second placement groove 25 and the third placement groove 26, that is, the second placement groove 25 and the third placement groove 26 can also be used as new rubbing roller placement grooves, and the exchange process is similar to that in the above example.

As illustrated in FIG. 1, the above-mentioned rubbing roller replacing position further includes a station C (i.e. the central line of the exchange placement platform 1 is located on the dashed line C illustrated in the figure), and when the exchange placement platform 1 is located in the station C, the first placement groove 24 is opposite to the first pressing device 6. In conjunction with the station C, more operations can be implemented by the replacing mechanism as follows.

In the first operation, worn rubbing roller(s) is (are) taken out from the rubbing equipment, but no new rubbing roller is replaced. Specifically, before the worn rubbing rollers are taken out, no rubbing roller is present in the first placement groove 24, the second placement groove 25 and the third placement groove 26 of the stage 2; first, the exchange placement platform 1 is pulled to the station A by the rubbing platform 4, and then the two worn rubbing rollers on the rubbing equipment are respectively detached and put into the third placement groove 26 and the second placement groove 25 of the stage 2 by the first pressing device 6 and the second pressing device 5; or the exchange placement platform 1 is pulled to the station B by the rubbing platform 4, and the two worn rubbing rollers on the rubbing equipment are respectively detached and put into the second placement groove 25 and the first placement groove 24 of the stage 2 by the first pressing device 6 and the second pressing device 5. Thus the operation is finished.

In the second operation, which is an operation of directly installing new rubbing roller(s) in the case of no worn rubbing roller present on the rubbing equipment, the exchange placement platform 1 is pulled by the rubbing platform 4 to the station A (the new rubbing rollers are placed in both the second placement groove 25 and the third placement groove 26 on the stage 2 at that time) or the station B (the new rubbing rollers are placed in both the first placement groove 24 and the second placement groove 25 on the stage 2 at that time), and then the new rubbing rollers are respectively taken out of the placement grooves of the stage 2 and installed by the first pressing device 6 and the second pressing device 5 (in the present embodiment, the term "install" means installing the new rubbing rollers in corresponding positions on the rubbing equipment), and thus the operation is finished, and namely, simultaneously the installation operation of the two new rubbing rollers is completed, and the position adjustment of the exchange placement platform 1 by the rubbing platform 4 specifically depends on the placing positions of the new rubbing rollers in the three placement grooves of the stage 2; or the exchange placement platform 1 is pulled by the rubbing platform 4 to the station C, and the new rubbing roller is taken out of the first placement groove 24 on the stage 2 and installed by the first pressing device 6, and thus the operation is finished, but the installation operation of only one new rubbing roller is completed.

In the third operation, it's assumed that the rubbing equipment has one worn rubbing roller which corresponds to the first pressing device 6 (or the second pressing device 5), and one new rubbing roller is placed in a placement groove of the stage 2. The detailed operation is as follows. The exchange placement platform 1 is pulled by the rubbing platform 4 to a corresponding exchange station, so that a vacant placement groove on the stage 2 is opposite to the first pressing device 6 (or the second pressing device 5), and the worn rubbing roller is detached and put into the vacant placement grove by the first pressing device 6 (or the second pressing device 5), and at the same time the exchange placement platform 1 is pulled by the rubbing platform 4 to another exchange station, so that the placement groove in which the new rubbing roller is placed on the stage 2 is opposite to the first pressing device 6 (or the second pressing device 5), and the new rubbing roller is taken out and installed by using the first pressing device 6 (or the second pressing device 5). Thus the operation is finished.

In the fourth operation, in the case that the rubbing equipment has two worn rubbing rollers, and the stage 2 has only one new rubbing roller, herein it is assumed that the worn rubbing roller corresponding to the first pressing device 6 (or the second pressing device 5) is to be exchanged. The detailed operation is as follows. The exchange placement platform 1 is pulled by the rubbing platform 4 to a corresponding exchange station, so that a vacant placement groove in the stage 2 is opposite to the first pressing device 6 (or the second pressing device 5), and the worn rubbing roller is detached and put into the vacant placement grove by using the first pressing device 6 (or the second pressing device 5); and at the same time the exchange placement platform 1 is pulled by the rubbing platform 4 to another exchange station, so that the placement groove in which the new rubbing roller is placed on the stage 2 is opposite to the first pressing device 6 (or the second pressing device 5), and the new rubbing roller is taken out and installed by using the first pressing device 6 (or the second pressing device 5). Thus the operation is finished.

In the fifth operation, which is an operation of installing two new rubbing rollers in the case that the rubbing equipment has only one rubbing roller which is a worn one, it is assumed that the worn rubbing roller corresponds to the first pressing device 6. Specifically, the exchange placement platform 1 is pulled by the rubbing platform 4 to a corresponding exchange station, so that a vacant placement groove on the stage 2 is opposite to the first pressing device 6, and the worn rubbing roller is detached and put into the vacant placement grove by the first pressing device 6, and the exchange placement platform 1 is pulled by the rubbing platform 4 to another exchange station, and the two new rubbing rollers placed on the stage 2 are respectively taken out and installed by using the first pressing device 6 and the second pressing device 5. Thus the operation is finished.

In the sixth operation, which is an operation of exchanging the positions between a rubbing roller corresponding to the first pressing device 6 and a rubbing roller corresponding to the second pressing device 5 in the rubbing equipment, in the case that before the position exchange operation, the three placement grooves in the stage 2 are all vacant, the exchange placement platform 1 is pulled by the rubbing platform 4 to the station B, and the rubbing roller corresponding to the first pressing device 6 is put into the second placement groove 25 by the first pressing device 6, and the rubbing roller corresponding to the second pressing device 5 is put into the first placement groove 24 by the second pressing device 5; then the exchange placement platform 1 is pulled by the rubbing platform 4 to the station A, and the rubbing roller in the second placement groove 25 is taken out and installed by the second pressing device 5; and finally, the exchange placement platform 1 is pulled by the rubbing platform 4 to the station C, and the rubbing roller in the first placement groove 24 is taken out and installed by the first pressing device 6. Thus the operation is finished.

Therefore, various operations can be implemented by the replacing mechanism through the above-mentioned three placement grooves in the stage and the station A, the station B and the station C of the rubbing roller replacing position.

In the case of two rubbing rollers present on the rubbing equipment, the stage 2 can also be provided with four placement grooves arranged in parallel, as schematically depicted in FIG. 5, which are a fourth placement groove, a fifth placement groove, a sixth placement groove and a seventh placement groove arranged in this order, and the fourth placement groove and the fifth placement groove are new rubbing roller placement grooves, i.e. when rubbing roller replacement has not been performed, new rubbing rollers are placed in the fourth placement groove and the fifth placement groove respectively, and the sixth placement grooves and the seventh placement grooves are worn rubbing roller placement grooves, i.e. after the replacement of rubbing rollers is completed, worn rubbing rollers are placed in the sixth placement groove and the seventh placement groove respectively; or the sixth placement groove and the seventh placement groove are new rubbing roller placement grooves, and the fourth placement groove and the fifth placement groove are worn rubbing roller placement grooves; the rubbing roller replacing position has: an exchange station in which the fourth placement groove is opposite to the second pressing device and the fifth placement groove is opposite to the first pressing device, the station being called a first station in order to facilitate description; and an exchange station in which the sixth placement groove is opposite to the second pressing device and the seventh placement groove is opposite to the first pressing device, the station being called a second station.

During specific operation, when new rubbing rollers are placed in the fourth placement groove and the fifth placement groove, first the exchange placement platform 1 is pulled by the rubbing platform 4 to the second station, so that the worn rubbing roller corresponding to the first pressing device 6 is put into the seventh placement groove by the first pressing device 6, and at the same time the worn rubbing roller corresponding to the second pressing device 5 is put into the sixth placement groove by the second pressing device 5; and then the exchange placement platform 1 is pulled by the rubbing platform 4 to the first station, and the new rubbing roller in the fifth placement groove is taken out and installed by the first pressing device 6, and at the same time the new rubbing roller in the fourth placement groove is taken out and installed by the second pressing device 5, and thus the exchange is finished; when new rubbing rollers are placed in the sixth placement groove and the seventh placement groove, first the exchange placement platform 1 is pulled by the rubbing platform 4 to the first station, so that the worn rubbing roller corresponding to the first pressing device 6 is put into the fifth placement groove by the first pressing device 6, and at the same time the worn rubbing roller corresponding to the second pressing device 5 is put into the fourth placement groove by the second pressing device 5; and then the exchange placement platform 1 is pulled by the rubbing platform 4 to the second station, and the new rubbing roller in the seventh placement groove is taken out and installed by the first pressing device 6, and at the same time the new rubbing roller in the sixth placement groove is taken out and installed by the second pressing device 5, and thus the exchange is finished.

It is to be noted that in the case of the above replacing mechanism with four placement grooves, it is also possible that the fourth placement groove and the sixth placement groove are new rubbing roller placement grooves, and the fifth placement groove and the seventh placement groove are worn rubbing roller placement grooves; or the fifth placement groove and the seventh placement groove are new rubbing roller placement grooves, and the fourth placement groove and the sixth placement groove are worn rubbing roller placement grooves; or the fourth placement groove and the seventh placement groove are new rubbing roller placement grooves, and the fifth placement groove and the sixth placement groove are worn rubbing roller placement grooves; or the fifth placement groove and the sixth placement groove are new rubbing roller placement grooves, and the fourth placement groove and the seventh placement groove are worn rubbing roller placement grooves. The rubbing roller replacing positions respectively corresponding to the various cases mentioned in the paragraph are related to the actual operational processes, that is, the rubbing roller replacing positions corresponding to different operational processes may be different, which is not described in detail herein.

In order to increase the accuracy of alignment between the exchange placement platform 1 and the stations for exchanging, the replacing mechanism further comprises:
position sensors 9 for exchange placement platforms in one-to-one correspondence with the respective stations for exchanging, used for sensing whether the exchange placement platform 1 has run to the corresponding stations for exchanging (such as the station A, B or C) in the rubbing roller replacing position, as illustrated in FIG. 1.

In order to determine the accuracy of alignment between the transport vehicle 3 and the initial position of the exchange placement platform 1, the above replacing mechanism further comprises a sensor 10 for detecting whether the transport vehicle has run to the initial position of the exchange placement platform 1, as illustrated in FIG. 1.

For example, in order to facilitate automatic connection and disconnection between the exchange placement platform 1 and the rubbing platform 4, the above connecting device 7 is an electromagnetic connector. The electromagnetic connector facilitates operation in which the rubbing platform 4 is connected with the exchange placement platform 1 when power is on, and the rubbing platform 4 is disconnected from the exchange placement platform 1 when power is off.

Figure 3:
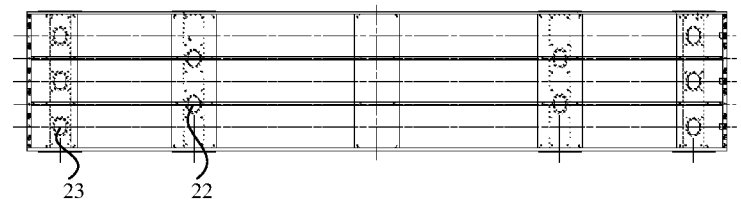
FIG. 3 is a schematic top view of the structure of the stage in the replacing mechanism provided in the present invention.

As illustrated in FIG. 3, to improve the stability and safety of the stage 2 when it is placed on the transport vehicle 3, preferably the stage 2 is provided with limit holes 22 for restricting the stage 2 from moving on the transport vehicle 3. When the stage 2 is placed on the transport vehicle 3, the stage 2 can be restricted on a stage of the transport vehicle 3 through the spacing holes 22, so that the stage 2 is not likely to slide on the transport vehicle 3.

Likewise, as illustrated in FIG. 3, to improve the stability and safety of the stage 2 when it is placed on the exchange placement platform 1, the stage 2 is provided with limit holes 23 for restricting the stage 2 from moving on the exchange placement platform 1. When the stage 2 is placed on the exchange placement platform 1, the stage 2 can be restricted on the exchange placement platform 1 through the limit holes 23, so that the stage 2 is not likely to slide on the exchange placement platform 1.

Figure 2:
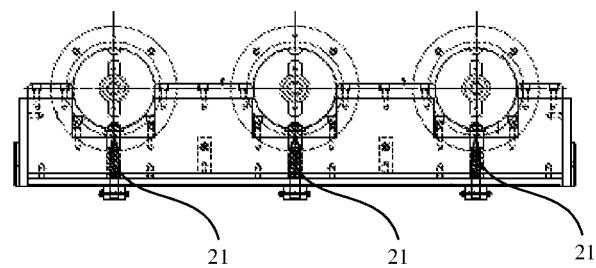
FIG. 2 is a schematic side view of a structure of a stage in the replacing mechanism provided in the present invention seen from the side corresponding to the active side of rubbing rollers.

Furthermore, as illustrated in FIG. 2, in order to improve the stability of the rubbing rollers after they are put into the placement grooves of the stage 2, the stage 2 is provided with rubbing roller stop pins 21 at the end corresponding to the active ends of the rubbing rollers put in the placement grooves thereof. After the rubbing rollers are put into the placement grooves of the stage 2, the active ends of the rubbing rollers are limited by the rubbing roller stop pins.

Obviously, various alterations and modifications can be made to the embodiments of the present invention by those skilled in the art without departing from the spirit and scope of the present invention. Thus, the present invention is also intended to include these alterations and modifications if they fall into the scope of the claims of the present invention and equivalent technologies thereof.

What is claimed is:

1. A replacing mechanism for replacing rubbing rollers of rubbing equipment, the rubbing equipment comprising pressing devices for:
   taking down worn rubbing rollers from the rubbing equipment and putting the worn rubbing rollers into vacant placement grooves of one stage, and/or
   taking out new rubbing rollers from placement grooves of the stage, in which the new rubbing rollers are placed, and installing the new rubbing rollers on the rubbing equipment,
   the replacing mechanism further comprising:
   the one stage, which has the placement grooves for holding the rubbing rollers, an exchange placement platform for conveying the stage to a rubbing roller replacing area,
   an exchange unit for:
   taking out the stage from a transport vehicle and placing the stage onto the exchange placement platform, and/or
   taking out the stage from the exchange placement platform and placing the stage onto the transport vehicle, and
   the replacing mechanism further comprising a connecting device for releasably connecting the exchange placement platform and a rubbing platform of the rubbing equipment,
   wherein the stage is provided with ones of the placement grooves arranged in parallel, the number of which is larger than that of the pressing devices of the rubbing equipment.

2. The replacing mechanism according to claim 1, wherein
   the rubbing equipment is provided with two of the rubbing rollers and two of the pressing devices, the two pressing devices are respectively a first pressing device and a second pressing device, and each pressing device in the rubbing equipment corresponds to one of the rubbing rollers of the rubbing equipment; and
   the stage is provided with at least three of the placement grooves arranged in parallel.

3. The replacing mechanism according to claim 2, wherein the at least three placement grooves include a first placement groove, a second placement groove, and a third placement groove, in this order; and
   wherein exchange placement platform is configured to convey the stage to a plurality of exchange positions within the rubbing roller replacing area, wherein the plurality of exchange positions includes:
   an exchange position in which the first placement groove is opposite to the second pressing device and the second placement groove is opposite to the first pressing device; and
   an exchange position in which the second placement groove is opposite to the second pressing device and the third placement groove is opposite to the first pressing device.

4. The replacing mechanism according to claim 3, wherein the plurality of exchange positions includes a further exchange position, and wherein the exchange placement platform is configured to convey the stage to the further exchange position in the rubbing roller replacing area, in which further exchange position the first placement groove is opposite to the first pressing device.

5. The replacing mechanism according to claim 2, wherein the at least three of the placement grooves includes four of the placement grooves arranged in parallel, the four placement grooves are a first placement groove, a second placement groove, a third placement groove, and a fourth placement groove, in this order; and
   wherein the exchange placement platform is configured to convey the stage to a plurality of exchange positions within the rubbing roller replacing area, wherein the plurality of exchange positions includes:
   an exchange position in which the first placement groove is opposite to the second pressing device and the second placement groove is opposite to the first pressing device; and
   an exchange position in which the third placement groove is opposite to the second pressing device and the fourth placement groove is opposite to the first pressing device.

6. The replacing mechanism according to claim 5, further comprising:
   a plurality of position sensors for sensing the exchange placement platform, the position sensors each being in one-to-one correspondence with a respective one of the exchange positions, the position sensors used for sensing whether the exchange placement platform has run to the corresponding exchange position in the rubbing roller replacing area.

7. The replacing mechanism according to claim 3, further comprising:
   a plurality of position sensors for sensing the exchange placement platform, the position sensors each being in one-to-one correspondence with a respective one of the exchange positions, the position sensors being used for sensing whether the exchange placement platform has run to the corresponding exchange position in the rubbing roller replacing area.

8. The replacing mechanism according to claim 7, wherein the connecting device is an electromagnetic connector.

9. The replacing mechanism according to claim 7, wherein the stage is provided with limit holes for restricting the stage from moving on the transport vehicle.

10. The replacing mechanism according to claim 7, wherein the stage is provided with limit holes for restricting the stage from moving on the exchange placement platform.

11. The replacing mechanism according to claim 7, wherein the stage is provided with rubbing roller stop pins at an end of the stage corresponding to active ends of the rubbing rollers put in the placement grooves.

12. The replacing mechanism according to claim 4, further comprising:
   a plurality of position sensors for sensing the exchange placement platform, the position sensors each being in one-to-one correspondence with a respective one of the exchange positions, the position sensors being used for sensing whether the exchange placement platform has run to the corresponding exchange position in the rubbing roller replacing area.

* * * * *